United States Patent [19]
Nishide et al.

[11] Patent Number: 5,788,025
[45] Date of Patent: Aug. 4, 1998

[54] REVERSING PREVENTING DEVICE

[75] Inventors: Seiji Nishide; Hideki Tanaka, both of Aichi-ken, Japan

[73] Assignee: Kabushiki Kaisha Tokai-Rika-Denki-Seisakusho, Aichi-ken, Japan

[21] Appl. No.: 679,729

[22] Filed: Jul. 12, 1996

Related U.S. Application Data

[63] Continuation-in-part of Ser. No. 362,115, Dec. 22, 1994, Pat. No. 5,634,690.

[30] Foreign Application Priority Data

Jul. 20, 1995 [JP] Japan ................... 7-183938

[51] Int. Cl.$^6$ ....................................... B60R 22/46
[52] U.S. Cl. ................... 188/82.7; 297/480; 242/374; 74/577 M
[58] Field of Search ............... 74/577 M; 188/82.1, 188/82.3, 82.7; 292/374; 280/806; 297/476, 478, 480

[56] References Cited

U.S. PATENT DOCUMENTS

| | | | |
|---|---|---|---|
| 3,834,645 | 9/1974 | Morishige | 188/82.7 |
| 3,985,212 | 10/1976 | Gershnow et al. | 188/82.7 |
| 4,029,267 | 6/1977 | Slipper | 188/82.7 |
| 4,932,722 | 6/1990 | Motozawa | 297/478 |
| 5,332,291 | 7/1994 | Fujimura et al. | 297/480 |
| 5,634,690 | 6/1997 | Watanabe et al. | 297/480 |
| 5,651,564 | 7/1997 | Isaji et al. | 297/480 |

FOREIGN PATENT DOCUMENTS

| | | |
|---|---|---|
| 347264 | 5/1991 | Japan. |
| 45148 | 1/1992 | Japan. |
| 5246303 | 9/1993 | Japan. |

OTHER PUBLICATIONS

Ser. No. 08 580,851, Dec. 29, 1995, Nishide.

*Primary Examiner*—Chris Schwartz
*Attorney, Agent, or Firm*—Sixbey Friedman Leedom & Ferguson; Thomas W. Cole

[57] ABSTRACT

A reversing preventing device for preventing the reversing of an object which is driven during a sudden deceleration of a vehicle includes: a gear which rotates and is connected to a driving member for driving the object; a pawl for preventing rotation of the gear, the pawl being supported by a base in such a manner as to be able to mesh with the gear, the pawl meshing with the gear when the object is tending to reverse; and a receiving portion provided in the base at a portion different from a portion for supporting the pawl, the receiving portion being adapted to receive part of a load acting on the pawl. Accordingly, the load acting on the pawl is dispersed to the portion for supporting the pawl and the receiving portion.

20 Claims, 9 Drawing Sheets

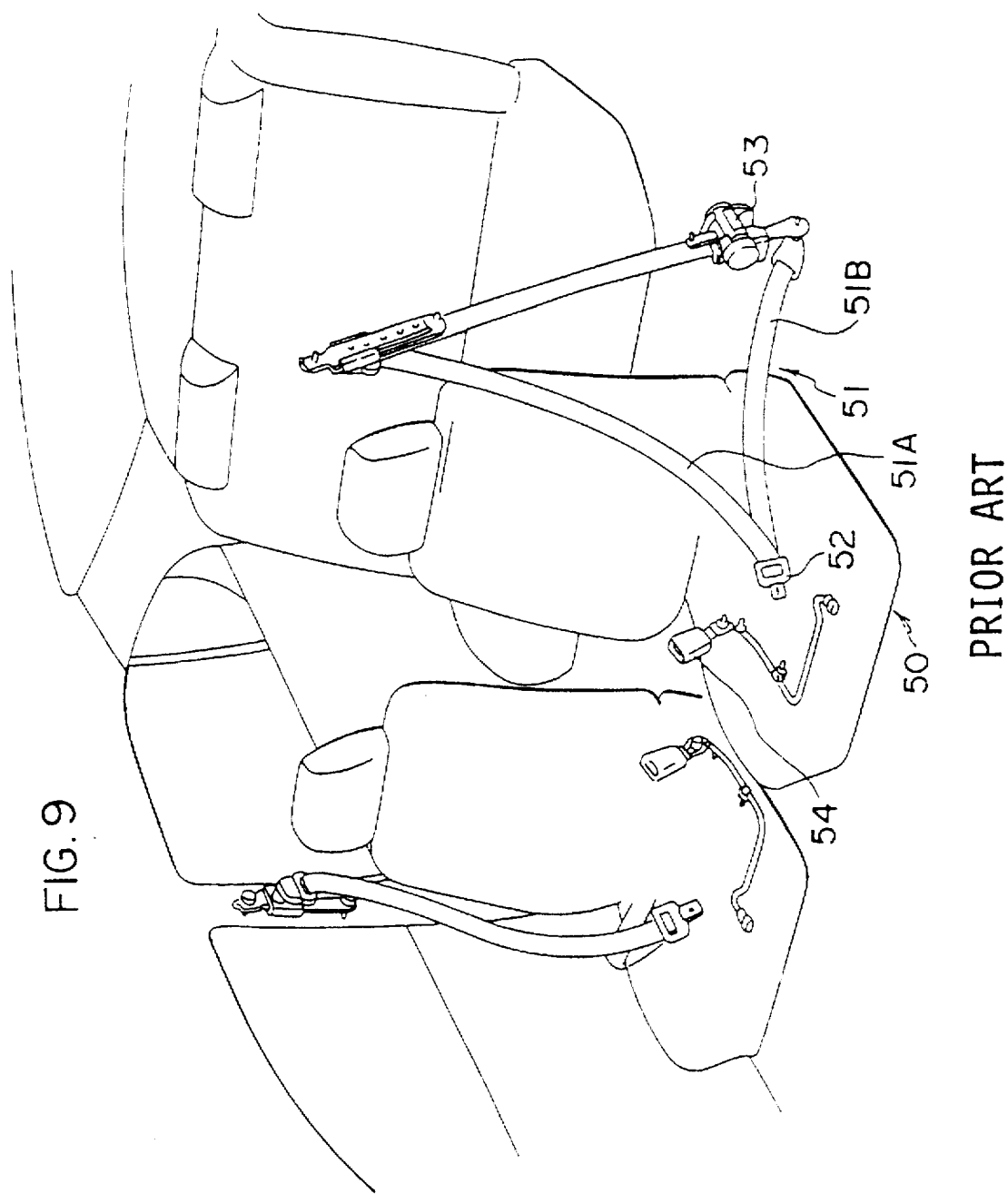

5,788,025

REVERSING PREVENTING DEVICE

This application is a continuation-in-part of U.S. patent application Ser. No. 362,115 filed Dec. 22, 1994, now issued as U.S. Pat. No. 5,634,690.

BACKGROUND OF THE INVENTION

1. Field of the Invention

The present invention relates to a reversing preventing device for preventing the reversing of an object, such as a buckle which is driven during a sudden deceleration of a vehicle.

2. Description of the Related Art

A seat belt used in a vehicle is generally arranged as shown in FIG. 9. Hereafter, a brief description will be given of this arrangement. A webbing 51 corresponding to a seat 50 is passed through a tongue plate 52. The portion of the webbing 51 at one side of the tongue plate 52 is a shoulder webbing 51A, while the portion of the webbing 51 at the other side of the tongue plate 52 is a waist webbing 51B. A retractor 53 is connected to one end of the shoulder webbing 51A.

A vehicle occupant who is seated in the seat 50 engages the tongue plate 52 with a buckle 54 located at a substantially central portion in the transverse direction of the vehicle, so as to apply the webbing 51 to himself or herself. As a means for allowing the webbing 51 to be applied closely to the vehicle occupant during a sudden deceleration of the vehicle, a mechanical retractor is known which is called an inner pretensioner for retracting in the downward direction of the vehicle body the buckle 54 to which the tongue plate 52 is engaged. A reversing preventing device for preventing the drawing out of the webbing 51 is disposed in the retractor. In the retractor, a wire which is driven in such a manner as to retract the buckle in the downward direction of the vehicle during a sudden deceleration of the vehicle is wound around a pulley, which is rotatably disposed on a base. A gear is connected to the pulley, and a pawl having engaging teeth is disposed on the base in correspondence with the gear. Namely, the pawl which constitutes a part of the reversing preventing device is rotatably disposed on a supporting shaft, and a screw is formed at a distal end of the supporting shaft. This supporting shaft is inserted into an insertion hole formed in the pawl, and the screw at the shaft portion is screwed in a screw hole formed in the base.

When the buckle 54 is retracted by a means for imparting tension to the wire during a sudden deceleration of the vehicle, the gear engages the engaging teeth of the pawl, so that the reversing of the buckle 54 is prevented. As a result, the slack of the webbing 51 is eliminated via the tongue plate 52 engaged with the buckle 54 shown in FIG. 9, thereby allowing the webbing 51 to be applied closely to the vehicle occupant.

In the reversing preventing device in the above-described conventional example, when the buckle 54 tends to reverse, the engagement of the pawl with the gear prevents the backward rotation of the gear. However, the pawl is subjected to a load imparted by the gear at the time of the engagement. Namely, a stress with respect to the load is concentrated on the supporting shaft of the pawl and the vicinity of an inner wall portion of the screw hole in the base into which the supporting shaft is screwed. For this reason, it is necessary to increase the strengths of the supporting shaft and the portion of the base corresponding thereto.

SUMMARY OF THE INVENTION

In view of the above-described circumstances, it is an object of the present invention to provide a reversing preventing device which is capable of dispersing stress occurring in the supporting portion of a pawl with respect to load from a gear during reversing, thereby reducing the load to which the supporting portion of the pawl is subjected.

In accordance with a first aspect of the present invention, there is provided a reversing preventing device for preventing the reversing of an object which is driven during a sudden deceleration of a vehicle, comprising: a gear which rotates and which is connected to a driving member for driving the object; a pawl for preventing rotation of the gear, the pawl being supported by a base by means of a supporting portion so as to be able to mesh with the gear, the pawl meshing with the gear when the object is tending to reverse; and receiving means provided in the base at a portion different from a portion for supporting the pawl, the receiving means being adapted to receive part of a load acting on the pawl.

In accordance with a second aspect of the present invention, in the reversing preventing device according to the first aspect of the invention, the pawl has a load transmitting portion for transmitting part of the load, the receiving means includes an engaging portion for engaging the load transmitting portion, and the part of the load is received by the engaging portion via the load transmitting portion.

When a driving force from a driving source is transmitted to the driving member such as a wire during a sudden deceleration of the vehicle, the driving member drives the object, such as the seat belt webbing, the buckle, or the like. As the object is driven by the driving member, the gear connected to the driving member rotates and retracts the object. In a case in which the object, such as the buckle, tends to reverse due to the tension or the like acting on the seat belt webbing, the reverse rotation of the gear is prevented by the pawl engaging with the gear, thereby preventing the reversing of the object.

When the object tends to reverse, the pawl meshes with the gear, and the pawl receives the load from the gear. A stress with respect to this load occurs not only in the supporting portion and the portion of the base for supporting the pawl, but also in the receiving means provided in the base at a portion different from the portion for supporting the pawl. Therefore, the stress is dispersed, thereby lowering the load received by the supporting portion and the portion of the base for supporting the pawl. Consequently, it becomes unnecessary to increase the strengths of the supporting portion and the portion for supporting the pawl, with the result that the setting of the shapes of the supporting portion and the portion of the base for supporting the pawl can be facilitated.

In accordance with a third aspect of the present invention, there is provided a reversing preventing device for preventing an object which is moved in a first direction by driving means during a sudden deceleration of a vehicle from being moved in a second direction opposite to the first direction after being moved in the first direction, comprising: a base member; a gear which is rotatably supported by the base member, and connects the driving means and the object, the gear being rotated in a third direction as the object is moved in the first direction by the driving means, and the gear being rotated in a fourth direction opposite to the third direction as the object is moved in the second direction; a pawl supported by the base member by means of a supporting portion in such a manner as to be rotatable between a first position at which the pawl meshes with the gear and a second position at which the pawl is spaced apart from the gear, the pawl preventing the movement of the object in the second direction by preventing the rotation of the gear in the fourth direction when the object tends to move in the second direction in a state in which the pawl is meshed with the gear; pawl meshing means which maintains the pawl in the second position when the gear rotates in the third direction, and which causes the pawl to prevent the rotation of the gear in the fourth direction by causing the pawl to mesh with the gear when the object tends to move in the second direction; and a receiving portion provided in the base member at a portion different from a portion for supporting the pawl, the receiving portion being adapted to receive part of a load acting on the pawl in the state in which the pawl is meshed with the gear.

It should be noted that the present invention is applicable not only to an arrangement in which the seat belt buckle is driven by a driving force and a tension is imparted to the webbing, but also to an arrangement in which an intermediate portion or the like of the webbing is directly pulled by a driving force. In this case, the webbing serves as the object. Furthermore, the present invention is also applicable to other automotive parts, such as a seat and a retracted-type steering wheel, insofar as the object needs to be driven during a sudden deceleration of the vehicle.

The above and other objects, features and advantages of the present invention will become more apparent from the following detailed description of the invention when read in conjunction with the accompanying drawings.

BRIEF DESCRIPTION OF THE DRAWINGS

FIG. 9 is a perspective view illustrating a seat belt used in a vehicle.

DESCRIPTION OF THE PREFERRED EMBODIMENTS

First Embodiment

Figure 1:
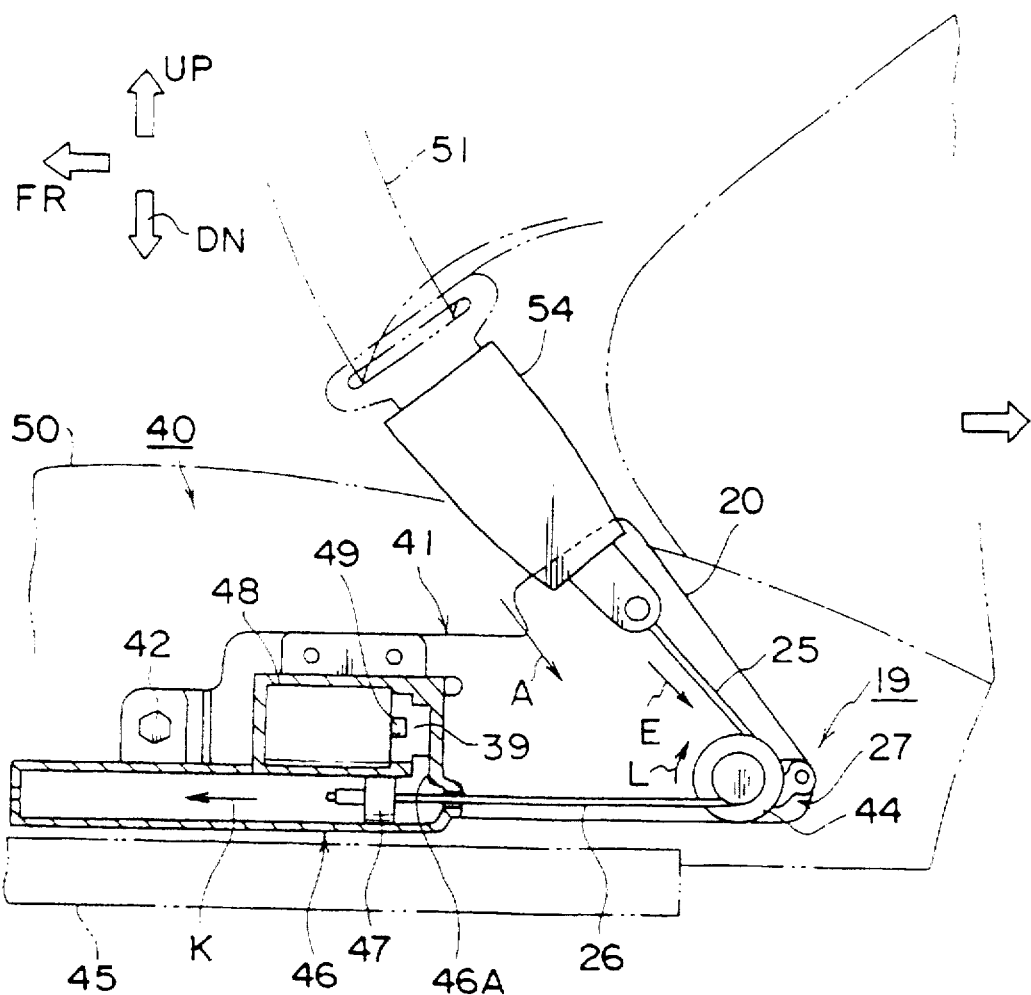
FIG. 1 is a schematic side elevational view of a buckle retractor in accordance with a first embodiment of the present invention in a state in which a cover of the buckle retractor is removed.
Figure 2:
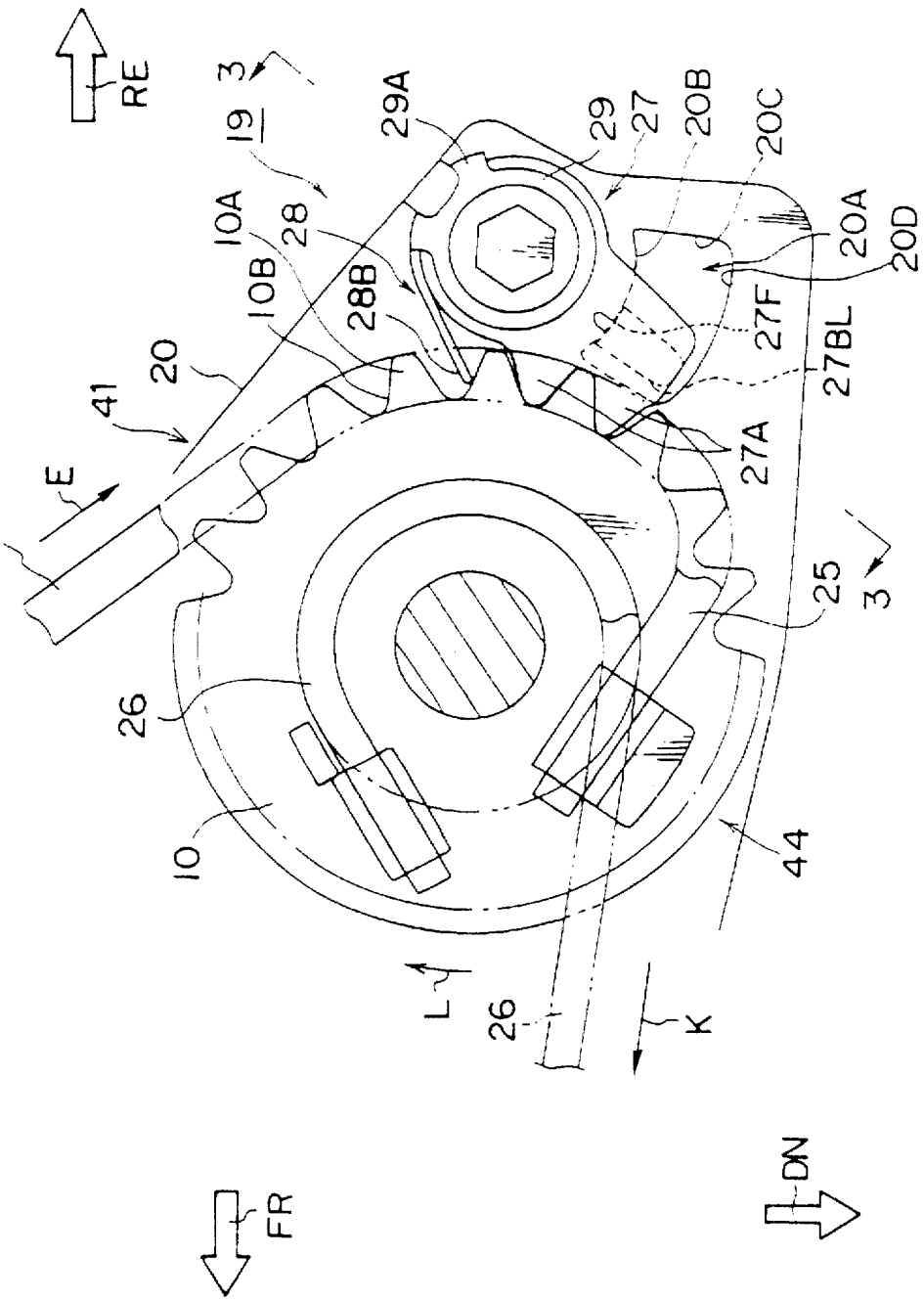
FIG. 2 is an enlarged side elevational view illustrating a reversing preventing device in the buckle retractor shown in FIG. 1.

Referring now to FIGS. 1 to 6, a description will be given of a first embodiment of the present invention. FIG. 1 is a schematic side elevational view of a buckle retractor 40 relating to the embodiments of the present invention with its cover removed. Incidentally, in FIG. 1, arrow FR indicates a forward direction of the vehicle, arrow RE indicates a rearward direction of the vehicle, arrow UP indicates an upward direction of the vehicle, and arrow DN indicates a downward direction of the vehicle. In addition, FIG. 2 shows a main portion of a buckle-reversing preventing device 19.

In FIG. 1, a main body portion 41 of the buckle retractor 40 is mounted by a mounting bolt 42 to a side of a seat 50 (shown by the two-dotted dash line in FIG. 1) which is supported on an unillustrated vehicle body such that its position is adjustable in the longitudinal direction of the vehicle by means of seat rails 45.

A buckle 54 serving as an object is held at the illustrated position, and is movable in a rearwardly downward direction (in the direction of arrow A in FIG. 1) of the vehicle by a driving force of a predetermined level or more. (The structure for guiding the buckle 54 is not shown.) In addition, one end of a first wire 25 serving as a driving member is connected to the buckle 54, as shown in FIG. 1. The other end of the first wire 25 is fixed to a pulley 44 which is pivotally supported by a plate base 20 of the main body portion 41 and is disposed at a position toward which the buckle 54 (see FIG. 1) is retracted, as shown in FIG. 2.

One end of a second wire 26 serving as a driving member is fixed to the pulley 44. The other end of the wire 26 is fixed to a piston 47 (which will be described later) extending in the longitudinal direction of the vehicle. The pulley 44 has the function of converting the direction of the transmission of the power of the wires 25 and 26 from the sliding direction of the piston 47 (the direction of arrow K) to the moving direction of the buckle 54 (the direction of arrow A). In addition, the pulley 44 has the function of increasing the amount of retraction of the buckle 54 such that the amount of retraction of the buckle 54 is greater than the amount of movement of the piston 47. A gear 10 as well as a first-wire winding groove and a second-wire winding groove (neither are shown) are formed coaxially on the pulley 44 sequentially from the plate base 20 side.

Figure 3:
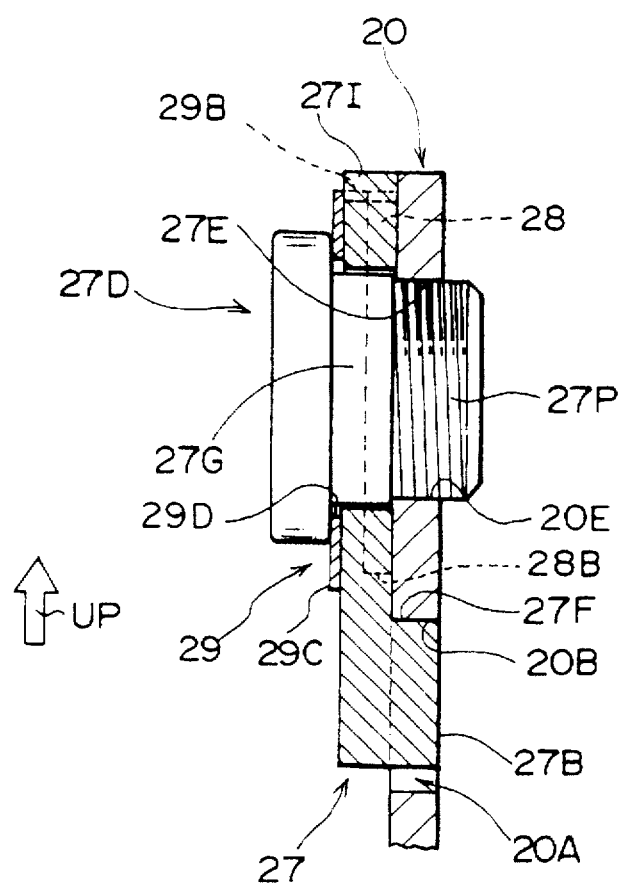
FIG. 3 is a cross-sectional view taken along line 3—3 of FIG. 2.
Figure 4:
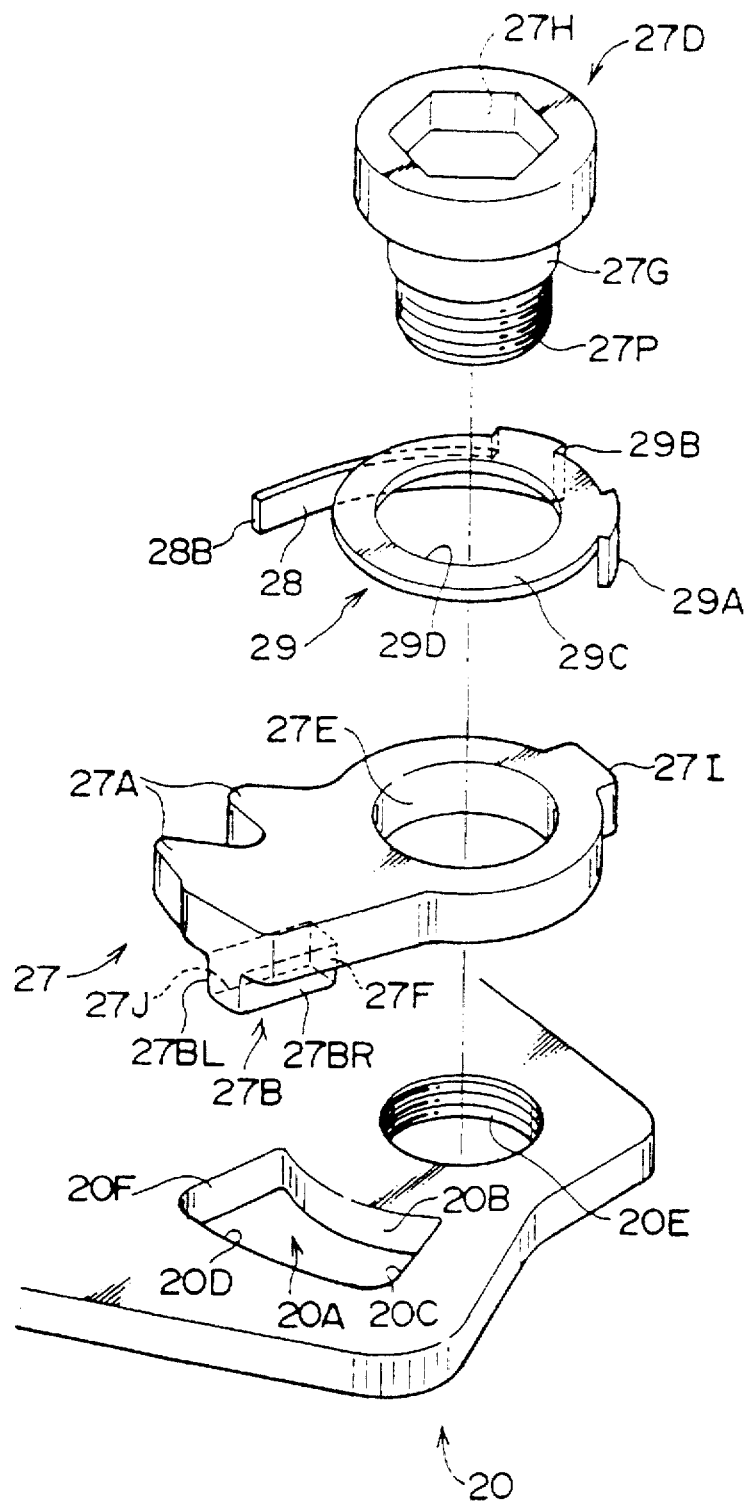
FIG. 4 is an exploded perspective view of a pawl for a plate base in accordance with the first embodiment.

As shown in FIGS. 1 and 2, a pawl 27 for preventing the rotation of the gear, which pawl 27 is a part of the reversing preventing device 19, is rotatably supported by the plate base 20 by means of a bolt 27D constituting a part of a supporting portion shown in FIGS. 3 and 4. More specifically, as shown in FIGS. 3 and 4, an insertion hole 27E, into which a shaft portion 27G of the bolt 27D is inserted, is formed in an end side of the pawl 27. It should be noted that a threaded portion 27P is formed at a distal end of the shaft portion 27G, and the diameter of the threaded portion 27P is slightly smaller than that of the shaft portion 27G.

A threaded hole 20E constituting a part of the supporting portion is formed in the plate base 20 at a position corresponding to the insertion hole 27E. The shaft portion 27G is inserted into the insertion hole 27E, and the threaded portion 27P is screwed in the threaded hole 20E. The head of the bolt 27D serving as the supporting portion or the shaft portion is circular, and a recess 27H for insertion of a portion of an unillustrated tool for tightening the bolt 27D is formed on the top surface of the head. Although, in the first embodiment, an example in which the recess 27H is formed in the top portion of the bolt 27D is shown, the peripheral surface of the head may be formed in a polygonal shape. In addition, although the pawl 27 is rotatably supported and positioned by the bolt 27D, this positioning means may be a rivet or the like.

Figure 5:
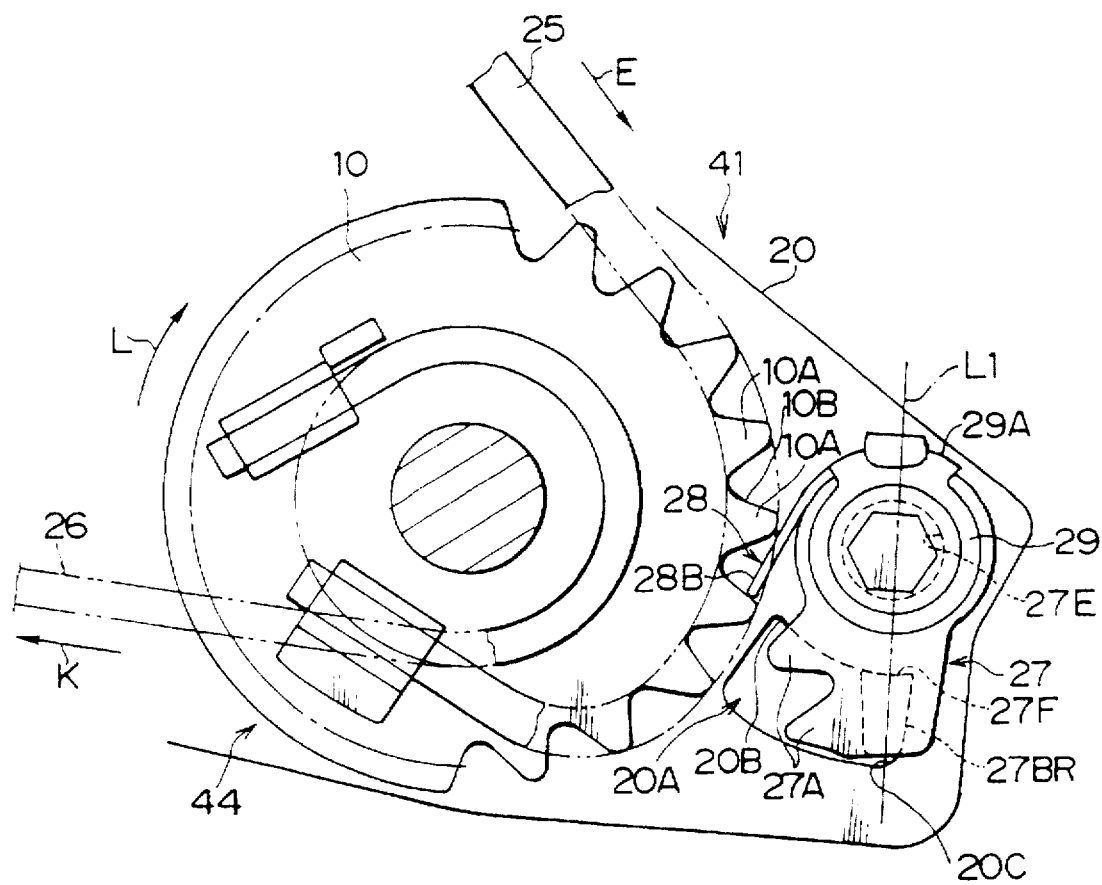
FIG. 5 is a side elevational view illustrating a state in which the gear teeth of a gear and the teeth of the pawl are spaced apart from each other in the first embodiment.
Figure 6:
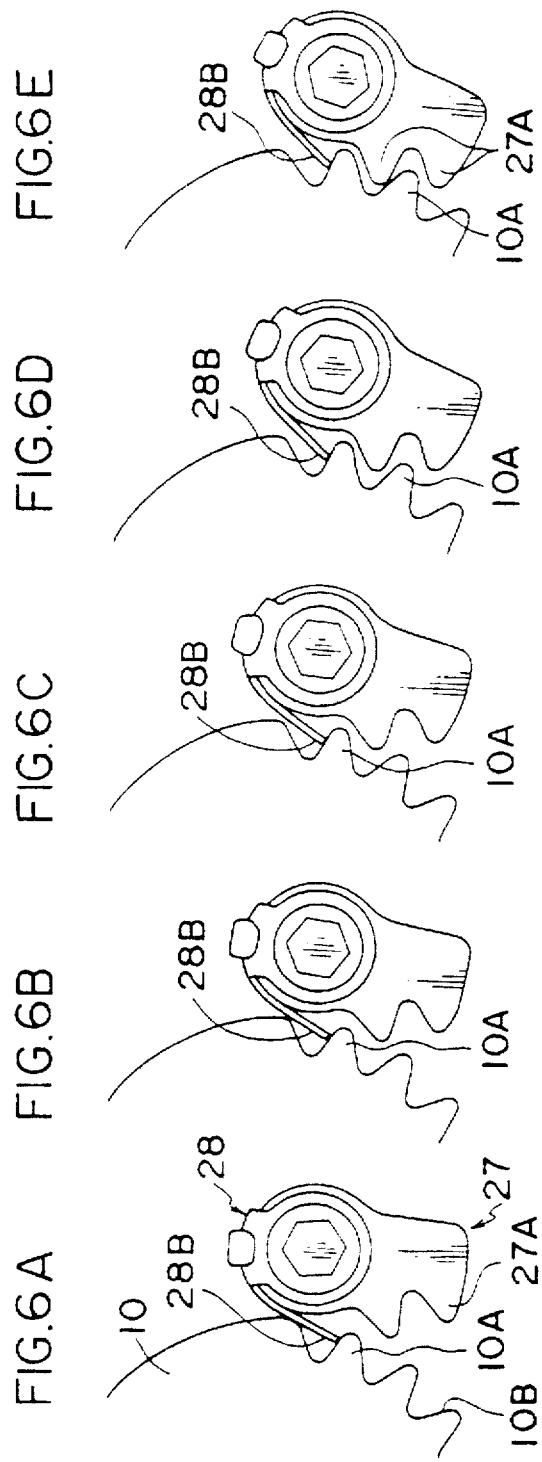
FIG. 6A is an operational diagram illustrating a state of engagement between the gear and the pawl in accordance with the first embodiment.
FIG. 6B is an operational diagram illustrating a state of engagement between the gear and the pawl in accordance with the first embodiment.
FIG. 6C is an operational diagram illustrating a state of engagement between the gear and the pawl in accordance with the first embodiment.
FIG. 6D is an operational diagram illustrating a state of engagement between the gear and the pawl in accordance with the first embodiment.
FIG. 6E is an operational diagram illustrating a state of engagement between the gear and the pawl in accordance with the first embodiment.

As shown in FIG. 2, two teeth 27A meshing with gear teeth 10A of the gear 10 are formed side by side on the pawl 27. As shown in FIG. 4, a projection 27B serving as a load transmitting means (portion) is provided on the side of the pawl 27 which is opposite the side in which the insertion hole 27E is formed, such that the projection 27B is disposed along a center line L1 (see FIG. 5) of the pawl 27 and projects toward the plate base 20. The projection 27B is substantially rectangular in a plan view, and is elongated along the center line L1. As shown in FIG. 2, an engaging hole 20A, which allows the pawl 27 to rotate in a range in which the teeth 27A of the pawl 27 can mesh with or move away from the gear 10, is formed in the plate base 20 at a position corresponding to the projection 27B. As shown in FIG. 3, a side surface 27F of the projection 27B constantly abuts against an inner side wall surface 20B of the engaging hole 20A. As shown in FIG. 5, as a side surface 27BR of the projection 27B abuts against an inner side wall surface 20C of the engaging hole 20A, the rotation of the pawl 27 in the direction in which the teeth 27A move away from the gear 10 (counterclockwise in FIG. 5) is restricted.

As shown in FIG. 4, an inner side wall surface 20D of the engaging hole 20A is formed such that a gap is formed between the inner side wall surface 20D and a side surface 27J of the projection 27B. In addition, when the gear teeth 10A and the teeth 27A mesh with each other, an inner side wall surface 20F of the engaging hole 20A is disposed such that a gap is formed between the inner side wall surface 20F and a side surface 27BL of the projection 27B. That is, by virtue of this gap, the meshing of the pawl 27 and the gear 10 is not affected by the interference caused by the abutment of the side surface 27BR of the projection 27B against the inner side wall surface 20C, so that the pawl 27 and the gear 10 are reliably meshed.

As shown in FIG. 4, a washer portion 29C is formed at an attaching member 29, and the attaching member 29 is attached to the pawl 27 by the shaft portion 27G of the bolt 27D being inserted into an insertion hole 29D of the washer portion 29C.

A projection 27I is formed on a substantially central portion of the side of the pawl 27 which is opposite to the side where the projection 27B is formed. A first stopper 29A and a second stopper 29B of the attaching member 29 are provided in such a manner as to nip the side walls of the projection 27I. Consequently, the attaching member 29 is made able to move integrally with the pawl 27.

A leaf spring 28 projects from the second stopper 29B of the attaching member 29. As shown in FIGS. 2 and 5, a distal end 28B of the leaf spring 28 constantly abuts against a face 10B of the gear tooth 10A of the gear 10.

In the state shown in FIG. 2, the leaf spring 28 urges the teeth 27A of the pawl 27 in the direction in which the teeth 27A mesh with the gear teeth 10A of the gear 10 (clockwise in FIG. 2). In addition, as the distal end 28B of the leaf spring 28 engages with the face 10B of the gear tooth 10A of the gear 10, the resiliency of the leaf spring 28 is transmitted to the pawl 27, so that the pawl 27 rotates in synchronism with the leaf spring 28. It should be noted that while the gear 10 is rotating in the driving direction (clockwise in FIG. 2), the pawl 27 is sprung up by the gear tooth 10A, so that the rotation of the gear 10 is not prevented.

The position of the bolt 27D of the pawl 27 and the shapes of the teeth 27A are determined in such a way that the pawl 27 is pressed by the gear teeth 10A of the gear 10 and is rotated counterclockwise when the wire 26 is pulled in the direction of arrow K shown in FIGS. 1 and 2, and the pulley 44 (gear 10) rotates clockwise in FIG. 2 (in the direction of arrow L).

When the wire 25 is pulled in the opposite direction to the direction of arrow E and the pulley 44 (gear 10) rotates counterclockwise, the pawl 27 is rotated clockwise by means of the compressive force or bending force which the leaf spring 28 receives from the gear tooth 10A, with the result that the teeth 27A of the pawl 27 are meshed with the gear teeth 10A. In this case, as shown in FIGS. 6A to 6E, shapes and dimensions of the various parts are determined such that when the leaf spring 28 is pushed by the gear tooth 10A and the pawl 27 rotates, the teeth 27A reliably mesh with the faces 10B of the gear teeth 10A, and the teeth 27A are brought to positions where they do not abut against the addenda of the gear teeth 10A so as to establish synchronization.

A description will now be given of a means for imparting tension to the wire 26.

At a portion of the main body portion 41 toward the front side of the vechile, a cylinder 46 extends in parallel with the seat rails 45 (shown by the two-dotted dash lines in FIG. 1) which are disposed substantially in the longitudinal direction of the vehicle. The cylindrical piston 47 which is able to slide in the longitudinal direction of the cylinder 46 is disposed in the cylinder 46. The other end of the second wire 26 is connected to a vehicle rear side end of the piston 47 (i.e., at the end of the piston 47 at the rear side of the vehicle), as shown in FIG. 1.

An acceleration sensor 48 for sensing the acceleration of the vehicle is provided above the vehicle rear side end of the cylinder 46. A detonator 49 is provided at the vehicle rear side end of the acceleration sensor 48. Further, a gas generating device 39 is provided at the vehicle rear side of the detonator 49. The arrangement provided is such that during a sudden deceleration of the vehicle, the acceleration sensor 48 causes the detonator 49 to ignite, and the gas generated by the gas generating device 39 is introduced to the cylinder 46, with the result that the piston 47 moves in the cylinder 46, thereby imparting a tensile force to the wire 26.

The aforementioned acceleration sensor 48 is formed by, among others, an inertial member (not shown) which inertially moves in the forward direction of the vehicle upon detection of the acceleration of the vehicle (a negative acceleration occurring during deceleration); a trigger spring (not shown) for constantly urging the inertial member in the rearward direction of the vehicle; and a firing pin (not shown) which is constantly urged toward the detonator 49, is movable in the rearward direction of the vehicle due to the movement of the inertial member in the forward direction of the vehicle, and flies toward the detonator 49.

A primer and a gas generating substance (neither are shown) are accommodated in the gas-generating device 39. As the detonator 49 is ignited, its spark is guided to the primer and is converted to thermal energy. Due to this thermal energy, the gas generating substance is burned and decomposed, thereby generating a large amount of gas.

A passage 46A for the gas which is generated by the gas generating device 39 is formed in the portion of the cylinder 46 where the gas generating device 39 is disposed. For this reason, the generated gas flows rapidly into the space at the rear surface side of the piston 47 of the cylinder 46 through the passage 46A, and suddenly increases the pressure at this portion, thereby moving the piston 47 in the forward direction of the vehicle (see arrow K in FIG. 1). The piston 47, the cylinder 46, and the gas generating device 39 form a driving source (a driving device, driving means).

Since the wires 25 and 26 are respectively wound around the pulley 44 (the directions in which they are wound are mutually opposite), as the piston 47 moves along the cylinder 46 in the direction of arrow K, tensile forces acting in the directions of arrows E and K are respectively imparted to the wires 25 and 26.

Next, a description will be given of the operation of the first embodiment arranged as described above.

During a sudden deceleration of the vehicle, the inertial member moves in the forward direction of the vehicle, so that the firing pin collides against the detonator 49 shown in FIG. 1. The detonator 49 is ignited by this collision, and the gas generating device 39 generates a large amount of gas in the above-described manner. This gas is supplied to the passage 46A and increases the pressure within the cylinder 46 at the rear side of the piston 47, thereby moving the piston 47 in the direction of arrow K. As a result of the movement of the piston 47, a tensile force is imparted to the wire 26, and the buckle 54 moves in the retracting direction (in the direction of arrow A) by this tensile force acting in the wire 26 and via the pulley 44 and the wire 25.

When the wire 26 is pulled in the direction of arrow K as shown in FIG. 2 during the sudden deceleration of the vehicle, the faces 10B of the gear teeth 10A push the teeth 27A of the pawl 27, causing the pawl 27 to rotate counterclockwise in FIG. 2. Consequently, the teeth 27A of the pawl 27 move away from the gear teeth 10A of the gear 10, and the pulley 44 (gear 10) rotates clockwise in FIG. 2 (in the direction of arrow L) by the tensile force acting in the wire 26, causing the wire 26 to be paid out from the pulley 44. Simultaneously, the wire 25 is taken up onto the pulley 44, and the buckle 54 is pulled in the direction of arrow A in FIG. 1, with the result that a tensile force is imparted to a webbing 51 so that the webbing 51 is fit closely to the vehicle occupant. Subsequently, the teeth 27A of the pawl 27 may engage the gear teeth 10A due to the urging force of the leaf spring 28, but do not hamper the rotation of the gear 10 while the gear 10 is rotating clockwise.

In a case in which the vehicle occupant presses the webbing 51 in the forward direction of the vehicle due to the inertial force, a force for pulling the wire 25 in the opposite direction to the direction of arrow E by means of the webbing 51 acts on the gear 10, so that the gear 10 tends to rotate counterclockwise in FIG. 2. In the state in which the pawl 27 meshes with the gear 10, the pawl 27 functions as a ratchet by preventing the counterclockwise rotation of the gear 10 in FIG. 2. Therefore, the gear 10 is not rotated counterclockwise, and the buckle shown in FIG. 1 is maintained in the state in which it is retracted in the direction of arrow A.

In addition, as shown in FIGS. 5 and 6A, if the gear 10 is rotated counterclockwise in the state in which the teeth 27A of the pawl 27 are spaced apart from the gear teeth 10A, the distal end 28B of the leaf spring 28 engaging with the face 10B of the gear tooth 10A of the gear 10 is pushed upward by the gear tooth 10A due to the rotation of the gear 10. Consequently, as shown in FIGS. 6B to 6E, the distal end 28B of the leaf spring 28 rotates the pawl 27 clockwise in synchronism with the movement of the tooth face 10B of the gear 10 owing to the resiliency of the leaf spring 28.

For this reason, even if the gear 10 rotates counterclockwise, the pawl 27 is synchronized with the rotation of the gear 10, and the gear teeth 10A and the teeth 27A mesh with each other, as shown in FIG. 2. Hence, even if a pulling-out force acts on the wire 25 (webbing 51) due to the inertial force of the vehicle occupant, the gear 10 and the pawl 27 can be reliably maintained in a meshed state.

In addition, at a time when the buckle 54 tends to reverse, when the wire 25 is pulled in the opposite direction to the direction of arrow E in FIG. 5 and the teeth 27A of the pawl 27 mesh with the gear teeth 10A of the gear 10, the load from the gear 10 is applied to the teeth 27A of the pawl 27. A stress with respect to this load occurs not only in the vicinity of the inner wall surface of the threaded hole 20E in the plate base 20 and in the vicinity of the shaft portion 27G of the bolt 27D corresponding to that inner wall surface, but also in the vicinity of the side surface 27F of the projection 27B of the pawl 27 and in the vicinity of the inner side wall surface 20B of the engaging hole 20A corresponding to the side surface 27F. Consequently, the stress can be dispersed. Accordingly, in accordance with the first embodiment, it is unnecessary to increase the strengths of the shaft portion 27G of the bolt 27D and a corresponding portion of the plate base 20, with the result that the setting of the shapes of the bolt 27D and the plate base 20 corresponding thereto can be facilitated.

Second Embodiment

Figure 7:
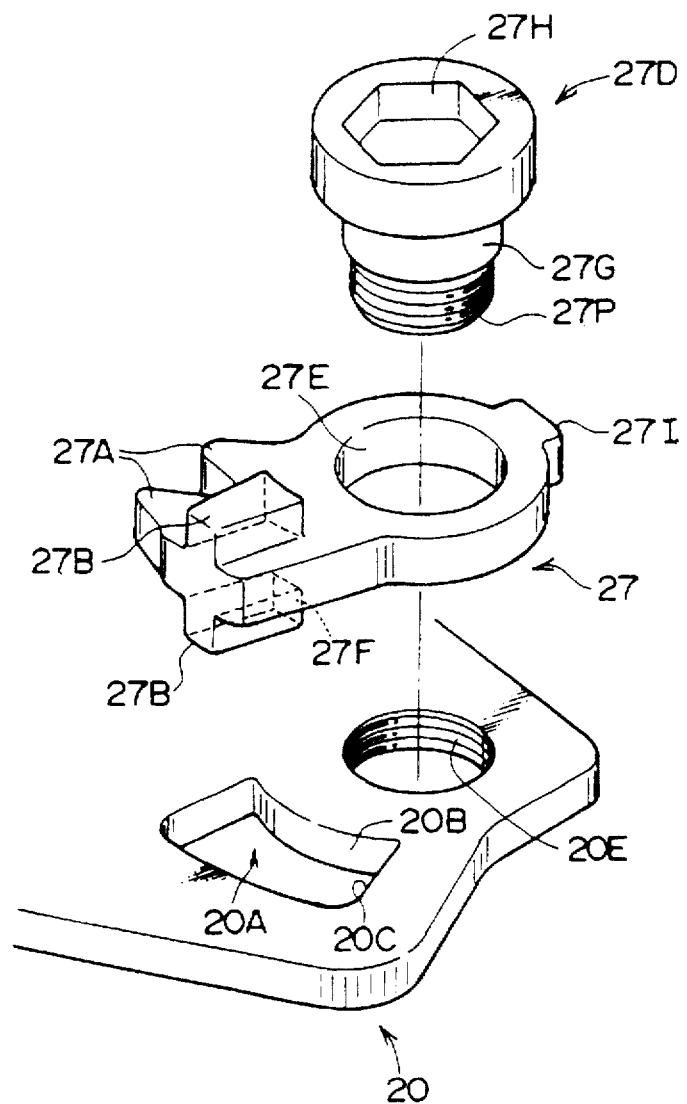
FIG. 7 is a perspective view illustrating a pawl and the plate base in accordance with a second embodiment.

FIG. 7 shows a second embodiment of the present invention. In the same way as the first embodiment, the second embodiment also illustrates an example in which the present invention is applied to the buckle-reversing preventing device 19 shown in FIG. 1. It should be noted that, in FIG. 7, illustration of the attaching member 29 is omitted.

The second embodiment illustrates an example in which the projection 27B is formed on each surface of the pawl 27 for preventing the rotation of the gear. This arrangement makes it possible to use the pawl 27 for both a seat on the left side of the vehicle and a seat on the right side of the vehicle. Namely, in the case of a buckle-reversing preventing device used for a seat on the right side, the projection 27B on the plate base 20 side shown in FIG. 7 is inserted in the engaging hole 20A. However, in the case of a device used for a seat on the left side of the vehicle, the projection 27B on the opposite side (i.e., on the upper side of the pawl 27 in FIG. 7) is inserted in the engaging hole 20A. The pawl 27 can be applied to either type of seat, so that the pawls 27 of the same shape can be mass produced. The other arrangements and the operational effect are the same as those of the first embodiment.

Third Embodiment

Figure 8:
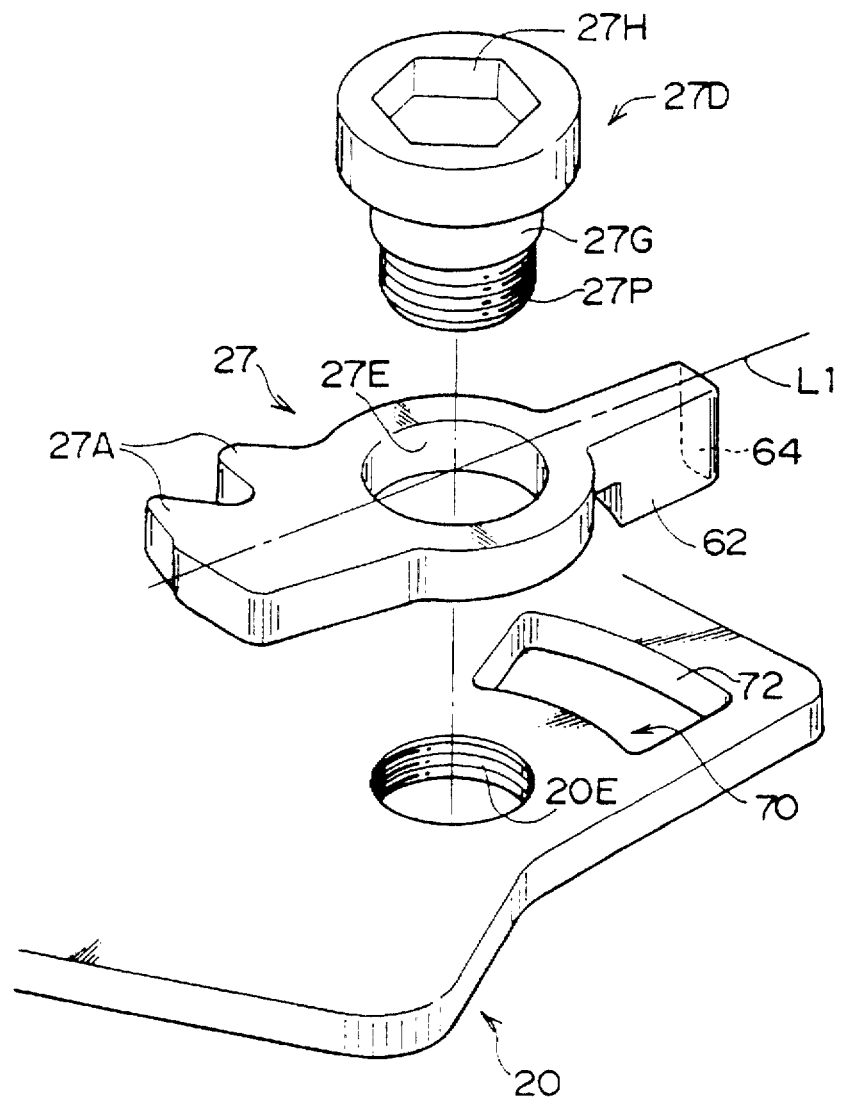
FIG. 8 is a perspective view illustrating a pawl and a plate base in accordance with a third embodiment.

FIG. 8 shows a third embodiment of the present invention. In the same way as the first embodiment, the third embodiment also illustrates an example in which the present invention is applied to the buckle-reversing preventing device 19 shown in FIG. 1. It should be noted that, in FIG. 8, illustration of the attaching member 29 is omitted.

The third embodiment illustrates an example in which a projection 62 projects from the side of the pawl 27 which is opposite to the side where the teeth 27A are provided, with the insertion hole 27E placed therebetween. An engaging hole 70 is formed in the plate base 20 in correspondence with the projection 62.

In the third embodiment, the pawl 27 is disposed in such a manner that a side surface 64 of the projection 62 constantly abuts against an inner side wall surface 72 of the engaging hole 70 corresponding to that side surface 64.

For this reason, at a time when the buckle 54 (see FIG. 1) tends to reverse, the stress with respect to a load from the gear 10 when the gear 10 (see FIG. 2) and the teeth 27A mesh with each other occurs not only in the vicinity of the inner wall surface of the threaded hole 20E in the plate base 20 and in the vicinity of the shaft portion 27G of the bolt 27D corresponding to that inner wall surface, but also in the vicinity of the side surface 64 of the projection 62 of the pawl 27 and in the vicinity of the inner side wall surface 72 of the engaging hole 70 corresponding to that side surface 64. Consequently, the stress can be dispersed. The other arrangements and the operational effect are the same as those of the first embodiment.

The third embodiment illustrates an example in which the projection 62 is formed only on the plate base 20 side of the pawl 27. However, in the same way as in the second embodiment, the projection may be formed on each surface of the pawl 27 so that the buckle-reversing preventing device can be used for both a seat on the left side of the vehicle and a seat on the right side.

In the above-described embodiments, the pawl 27 is provided with the projection(s) 27B or 62 serving as a load imparting means, the engaging hole 20A or 70 for accommodating the projection is formed in the plate base 20, and an end portion of the engaging hole 20A or 70 serves as a receiving means or a receiving portion. However, even if the engaging hole is provided in the pawl, and the projection is provided on the plate base, the present invention can be applied in the same way as the above-described embodiments.

In the above-described embodiments, to transmit the driving force of the buckle retractor 40 from the buckle retractor 40 to the buckle 54, the driving stroke is increased by using the two wires 25 and 26 together with the first-wire winding groove and the second-wire winding groove. However, a single wire may be connected from the detonator 49 to the buckle 54, and an intermediate portion of the wire may be wound around the pulley 44.

What is claimed is:

1. A reversing preventing device for preventing the reversing of an object which is driven during a sudden deceleration of a vehicle, comprising:

a gear which rotates and which is connected to a driving member for driving the object;

a pawl for preventing rotation of said gear, said pawl being supported by a base by means of a supporting portion so as to be able to mesh with said gear, said pawl meshing with said gear when the object is tending to reverse; and receiving means provided in said base at a portion different from a portion for supporting said pawl, said receiving means being adapted to receive part of a load acting on said pawl.

2. A reversing preventing device according to claim 1, wherein said pawl has a load transmitting portion for transmitting part of the load, said receiving means includes an engaging portion for engaging said load transmitting portion, and the part of the load is received by said engaging portion via said load transmitting portion.

3. A reversing preventing device according to claim 2, wherein said pawl is rotatable in a first direction allowing said pawl to mesh with said gear and in a second direction which is opposite to the first direction and allows said pawl to be spaced apart from said gear, said load transmitting portion is a projection projecting toward said base, said engaging portion is an inner side wall surface of a hole which accommodates said projection and permits the rotation of said pawl, said projection has an abutting portion which constantly abuts against the inner side wall surface of the hole, and said base receives the part of the load at the inner side wall surface by means of said abutting portion.

4. A reversing preventing device according to claim 3, further comprising meshing means for causing said pawl to mesh with said gear.

5. A reversing preventing device according to claim 2, wherein said pawl is rotatable between a first position at which said pawl meshes with said gear and a second position at which said pawl is spaced apart from said gear, said load transmitting portion is a projection projecting toward said base, said engaging portion is an inner side wall surface of a hole which accommodates said projection and permits rotation of said pawl, said projection has an abutting portion which constantly abuts against the inner side wall surface of the hole, and said base receives the part of the load at the inner side wall surface by means of said abutting portion.

6. A reversing preventing device according to claim 5, further comprising meshing means for causing said pawl to mesh with said gear.

7. A reversing preventing device according to claim 2, wherein said pawl is rotatable between a first position at which said pawl meshes with said gear and a second position at which said pawl is spaced apart from said gear, said pawl has a pair of projections projecting in mutually opposite directions substantially perpendicular to a plane of rotation of said pawl, said receiving means is an inner side wall surface of a hole which accommodates one of said pair of projections and permits the rotation of said pawl, said one of said pair of projections has an abutting portion which constantly abuts against the inner side wall surface of the hole, and said base receives the part of the load at the inner side wall surface by means of said abutting portion.

8. A reversing preventing device according to claim 7, further comprising meshing means for causing said pawl to mesh with said gear.

9. A reversing preventing device according to claim 2, further comprising meshing means for causing said pawl to mesh with said gear.

10. A reversing preventing device according to claim 1, wherein said pawl is rotatable between a first position at which said pawl meshes with said gear and a second position at which said pawl is spaced apart from said gear, said pawl has a pair of projections projecting in mutually opposite directions substantially perpendicular to a plane of rotation of said pawl, said receiving means is an inner side wall surface of a hole which accommodates one of said pair of projections and permits the rotation of said pawl, said one of said pair of projections has an abutting portion which constantly abuts against the inner side wall surface of the hole, and said base receives the part of the load at the inner side wall surface by means of said abutting portion.

11. A reversing preventing device according to claim 10, further comprising meshing means for causing said pawl to mesh with said gear.

12. A reversing preventing device according to claim 1, further comprising meshing means for causing said pawl to mesh with said gear.

13. A reversing preventing device for preventing an object which is moved in a first direction by driving means during a sudden deceleration of a vehicle from being moved in a second direction opposite to the first direction after being moved in the first direction, comprising:

a base member;

a gear which is rotatably supported by said base member, and connects said driving means and the object, said gear being rotated in a third direction as the object is moved in the first direction by said driving means, and said gear being rotated in a fourth direction opposite to the third direction as the object is moved in the second direction;

a pawl supported by said base member by means of a supporting portion in such a manner as to be rotatable between a first position at which said pawl meshes with said gear and a second position at which said pawl is spaced apart from said gear, said pawl preventing movement of the object in the second direction by preventing rotation of said gear in the fourth direction when the object tends to move in the second direction in a state in which said pawl is meshed with said gear;

pawl meshing means which maintains said pawl in the second position when said gear rotates in the third direction, and which causes said pawl to prevent the rotation of said gear in the fourth direction by causing said pawl to mesh with said gear when the object tends to move in the second direction; and a receiving portion provided in said base member at a portion different from a portion for supporting said pawl, said receiving portion being adapted to receive part of a load acting on said pawl in the state in which said pawl is meshed with said gear.

14. A reversing preventing device according to claim 13, wherein said pawl has a pair of projections projecting in mutually opposite directions substantially perpendicular to a plane of rotation of said pawl, said receiving portion is an inner side wall surface of a hole which accommodates one of said pair of projections and permits the rotation of said pawl, said one of said pair of projections has an abutting portion which constantly abuts against the inner side wall surface of the hole, and said base member receives the part of the load at the inner side wall surface by means of said abutting portion.

15. A reversing preventing device according to claim 14, wherein said base member is a plate-shaped member.

16. A reversing preventing device according to claim 15, wherein said hole is a through hole.

17. A reversing preventing device according to claim 13, wherein said pawl has a load transmitting portion for transmitting part of the load, said receiving portion includes an engaging portion for engaging said load transmitting portion, and the part of the load is received by said engaging portion via said load transmitting portion.

18. A reversing preventing device according to claim 17, wherein said load transmitting portion is a projection projecting toward said base member, said engaging portion is an inner side wall surface of a hole which accommodates said projection and permits the rotation of said pawl, said projection has an abutting portion which constantly abuts against the inner side wall surface of the hole, and said base member receives the part of the load at the inner side wall surface by means of said abutting portion.

19. A reversing preventing device according to claim 13, wherein said supporting portion is a shaft member.

20. A reversing preventing device according to claim 13, wherein the object is a buckle device for retaining a webbing applied to an occupant of a vehicle.

* * * * *